United States Patent Office 3,504,022
Patented Mar. 31, 1970

3,504,022
OXIDATION OF ARALKYL COMPOUNDS
Clarence R. Bresson, Bartlesville, Okla., assignor to Phillips Petroleum Company, a corporation of Delaware
No Drawing. Filed Nov. 14, 1966, Ser. No. 593,666
Int. Cl. C07c 63/02
U.S. Cl. 260—524            9 Claims

ABSTRACT OF THE DISCLOSURE

Oxidation of aliphatic side chains on aromatic sulfides and sulfoxides in the presence of cobalt-bromine-carboxylic acid catalysts to produce acid and ketone derivatives having utility as plasticizers and cross-linking agents.

---

This invention relates to a process of oxidation, and the products produced by the process.

In another aspect, the invention relates to a method for selectively oxidizing the α-carbon atoms in the alkyl substituents of aromatic sulfides and aromatic sulfoxides with oxygen in the presence of a catalyst prepared by reacting a cobalt compound, a carboxylic acid, and a bromine reagent.

In still another aspect, the invention relates to a new composition of matter comprising the carboxylic acids and ketones of aromatic sulfides and aromatic sulfoxides in which at least one carbonyl group is present in a position α to a carbon atom in the aromatic ring.

Hydrocarbon side chains on aromatic nuclei have comparatively little tendency to oxidize to acids or ketones. Usually elevated temperatures and strong oxidizing agents such as chromic oxide-sulfuric acid are used. Air oxidation has been effected with ozone and metal oxide catalysts. This procedure is a vigorous one which generally oxidizes any portion of a molecule which is oxidizable. And, thus, it cannot be used to oxidize the alkyl substituents of aromatic sulfides and sulfoxides to acids or ketones without attacking the oxidizable sulfur atom which leads to the formation of the corresponding sulfones—even before the alkyl group itself has been oxidized. The sulfides are especially sensitive to air oxidation.

It is an object of this invention to oxidize the α-carbon atoms in the alkyl substituents of aryl sulfides and sulfoxides. It is also an object of this invention to prepare new plasticizers and cross linking agents.

Other aspects, objects and the several advantages of this invention will become apparent to one skilled in the art from a reading of the disclosure and appended claims.

In accordance with the invention, it has been found that by contacting an aryl sulfide or aryl sulfoxide of the formula

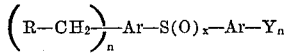

wherein $x$ is 0 or 1, each $n$ is 1 to 5, each Ar is a monocyclic or polycyclic aromatic radical preferably containing 6–14 carbon atoms, each R is hydrogen or an alkyl, aryl, or cycloalkyl radical preferably containing 1–20 carbon atoms, each Y is hydrogen or a (R—CH$_2$)- radical, and the total number of carbon atoms in the molecule preferably ranges from 13 to about 50, with oxygen and a catalyst consisting essentially of a cobalt salt, a carboxylic acid, and a bromine reagent, the saturated α-carbon atom of at least one of the alkyl substituents is oxidized, but the sulfide or sulfoxide group is unchanged.

Some specific examples of suitable sulfides and sulfoxides are:

p-tolyl sulfide
p-tolyl sulfoxide
m-tolyl sulfoxide
bis(3,4,5-trimethylphenyl) sulfide
bis(2-butyl-1-naphthyl) sulfide
bis[4-(2-cyclopentylethyl)phenyl] sulfoxide
bis(4-benzylphenyl) sulfide
bis(2,3,4-trimethyl-5,6-diethylphenyl) sulfide
1-eicosyl-2-anthracyl 4-decylphenyl sulfide
3-(2-ethylhexyl)phenyl p-tolyl sulfoxide
o-tolyl p-tolyl sulfide
phenyl p-ethylphenyl sulfide and the like, and mixtures thereof.

This invention has proved valuable in making a new class of compounds suitable for use as plasticizers and cross linking agents, among which are 4,4'-thiodibenzoic acid and 4-carboxyphenyl p-tolyl sulfoxide.

The cobalt portion of the catalyst is furnished by cobalt compounds in the di- or tri-valent state. Specific examples include cobalt salts of carboxylic acids preferably having up to about 20 carbon atoms per molecule and cobalt bromide. Where the reaction is carried out in the presence of a large amount of a carboxylic acid, such as acetic acid, cobalt generally takes the form of the acetate in the reaction mixture. Thus, any cobalt salt of the type described which is soluble in the solvent employed in an amount sufficient to form the catalyst is satisfactory for the process. A preferred source of cobalt is cobaltous acetate tetrahydrate. However, other suitable catalysts can be used, including cobaltous salts of other lower aliphatic acids, such as cobaltous propionate, cobaltous butyrate, and so on. Cobaltous salts of aromatic carboxylic acids can also be used as catalysts; for example, salts such as cobaltous benzoate, cobaltous toluate, cobaltous terephthalate, cobaltous naphthalene carboxylate and so on. Cobalt salts of anions that inactivate the catalyst should be avoided; such anions are sulfate, nitrate, iodide, iodate, chlorate, and so on.

The bromine reagent portion of the catalyst is generally furnished by bromine compounds containing bromine capable of being readily removed from the parent compound. Specific compounds include the bromocarboxylic acids, including the bromoaliphatic acids such as bromoacetate acids, bromopropionic acids, and so on, cycloaliphatic carboxylic acids containing removable bromine, such as α-bromocyclohexanecarboxylic acid. Free bromine and bromocarbons containing bromine capable of being readily removed from the parent compound, for example, bromochloroform, hydrogen bromide, cobalt bromide and so on can also be used. Equal molar amounts of HBr and cobalt acetate produce an extremely active catalyst.

The molar ratio of cobalt to bromine (calculated as monatomic bromine) is important for maximum reaction rates. Optimum reaction rates are obtained when cobalt and bromine are present in substantially equal atomic amounts (that is, about 0.9–1.1 atoms of bromine per atom of cobalt). The rate of reaction decreases rapidly as the bromine/cobalt atomic ratio is increased, and as the bromine/cobalt atomic ratio is decreased from unity there is a decrease in activity although this decrease is less marked. Broadly, however, bromine/cobalt atomic ratios of 0.1–1.2 are most useful, although ratios outside of these limits can also be employed. However, the bromine/cobalt atomic ratio should, generally, not be greater than about 2.

The carboxylic acid portion of the catalyst is generally furnished by carboxylic acids or salts of carboxylic acids such as a cobalt salt. Carboxylic acids having up to about 20 carbon atoms per molecule are suitable. Other sources of the carboxylic acid portion of the catalyst comprise compounds capable of forming carboxylic acids in situ even in very small amounts.

Examples of carboxylic acids and salts thereof include:

acetic acid
propionic acid
butyric acid
naphthenic acid
benzoic acid
arachidic acid
cobalt acetate
cobalt caproate and the like and mixtures thereof.

The molar ratio of the carboxylic acid to cobalt has no upper limit with the result that carboxylic acids can be employed as the solvent for the reaction. Although small amounts of carboxylic acid can also be used to effect oxidation, for example, in a molar ratio of about 2:1 in respect to cobalt, for higher yields and rates, it is preferable to employ larger amounts of carboxylic acid, preferably solvent quantities.

Carboxylic acid precursors, such as carboxylic anhydrides, for example, acetic anhydride, can also be employed. These anhydrides serve as solvents and as a means of removing water and can furnish the carboxylic acid necessary for the catalyst. Mixtures of these acids with other solvents can also be employed; for example, mixtures of acetic acid with acetophenone are suitable. However, the lower aliphatic carboxylic acids, such as acetic and propionic acids, are the preferred solvents of this process.

A wide variety of solvents can be employed in the reaction with maximum yields being obtained with inert solvents which do not adversely affect the reaction and in which both reactant and catalyst are soluble. Because carboxylic acids make excellent solvents for both the reactant and catalyst, they are the preferred solvents. Since carboxylic acids form part of the catalyst and there is no upper limit to the amount of carboxylic acid the reaction will tolerate, these solvents can be used as the source of the carboxyl portion of the catalyst as well as the solvent. For obvious reasons, it is highly desirable to use a liquid carboxylic acid although solid carboxylic acids can be used in conjunction with other solvents or under liquefying conditions. Thus, benzoic acid dissolved in benzene has been used as a combined solvent and source of the carboxylic acid portion of the catalyst system. Soluble, liquid, or liquefiable products of the oxidation can be used as solvents in the reaction so that separation steps are minimized.

The rate of oxygen addition to the reaction can vary within any desired limits. Since the function of the oxygen is to oxidize the α-carbon group of the alkyl substituent to a carbonyl groups, the rate of reaction is dependent to some extent on the amount of oxygen present at any given time in the area of the reaction mixture. Thus, the rate of reaction is faster with higher rates of oxygen addition than with lower rates of addition. Satisfactory results have been obtained by adding oxygen to the reaction mixture at the rate of from 0.01 to 10, and preferably from 0.05 to 5 parts by weight of oxygen per hour per part of the alkyl substituted aryl sulfide or sulfoxide. If desired, the conversion can be limited by manipulation of the reaction conditions to permit oxidation of only some of the oxidizable α-carbon atoms present on the molecule. It should be understood that in addition to employing pure oxygen as the oxidizing agent in this process, it is also possible to employ any oxygen-containing gas in which the ingredient other than oxygen is inert under the conditions of the reaction. Thus, satisfactory results have been obtained employing air instead of pure oxygen in the feed gas to the reaction.

The process of this invention can be carried out at subatmospheric pressure, atmospheric pressure or superatmospheric pressure. However, there is no particular advantage to carrying out the process at any pressure other than atmospheric. In carrying out the reaction at elevated pressures the use of relatively expensive high pressure process equipment is required. Since the reaction proceeds at a reasonable rate at atmospheric pressure, it is not deemed advantageous to carry out the reaction at elevated pressures although there are no particular disadvantages to the use of elevated pressures other than the equipment cost problem.

The temperature of the reaction can vary within fairly wide limits. Although the reaction occurs with temperatures as low as room temperature (i.e. about 25° C.), reaction below 50° C. proceeds at a slower rate than at higher temperatures, such as from 70°–160° C. However, it has been found that the optimum temperature varies with the specific substituted sulfide or sulfoxide oxidized. Temperatures at which undesired side reactions occur should obviously be avoided. It is frequently preferred to carry out the reaction at the reflux temperature of the reaction mixture. When the reaction mixture contains a large amount of acetic acid as a solvent and this acid is the lowest boiling major constituent of the reaction mixture, it is found that the reflux temperature is near the boiling point at atmospheric pressure of the acid, i.e. about 110–115° C.

In the oxidation of the substituted aryl compounds of the present invention, one of the products of the reaction is water. It is preferred to carry out the reaction under nearly anhydrous conditions, thus, the water should be removed as rapidly as it is formed. The removal of water during the reaction is readily accomplished by allowing the water to distill from the reaction mixture as it is formed. Azeotroping agents, such as benzene, heptane, and the like, can also be used in removing water from the reaction mixture. In addition, carboxylic acid anhydrides can be used as a means of removing water. In general, it is desirable to operate with a maximum of about 0.05 part water per part solvent.

The catalyst will be effective in the oxidation of the substituted aryl sulfides or sulfoxides of the present invention regardless of the amount of this compound present in the reaction mixture at any given time. However, since oxidation is extremely rapid and water is a product of the reaction, a controlling factor on the rate of oxidation is the rate at which water is removed. Thus, any amount of substituted aryl sulfide or aryl sulfoxide compound can be present during the reaction provided the water content of the reaction mixture is below about 0.05 part per part of solvent. In practice, satisfactory results are obtained when employing from about 0.01 to about 0.5 part per weight of the aryl sulfide or sulfoxide compound per part of solvent. The conversion can be carried out batchwise, and it is particularly suitable for the continuous operation. The oxidized sulfide or sulfoxide product generally precipitates from the reaction solution and thus can be continuously filtered off while the unoxidized sulfide or sulfoxide is continuously fed into the reaction zone.

In a preferred embodiment for practicing the process of this invention, an aromatic sulfide or sulfoxide as defined above is added to a reactor which contains a bromine reagent such as hydrogen bromide, a cobalt salt such as cobalt acetate, and a carboxylic acid such as acetic or propionic acid. Air is bubbled into the reactor at reflux temperature for a time sufficient to permit the formation of the oxidized compound. The water produced in the reaction is allowed to distill from the reaction zone, being assisted by the flow of air. The product can then be isolated and purified by any suitable method known to those in the art such as by washing with water, and/or an acid or mixture of acids.

The process can also be carried out in a continuous manner by continuously adding both a substituted aromatic sulfide or sulfoxide and oxygen to a solution of the cobalt-bromine-carboxylic acid catalyst in a solvent. Alternatively, the catalyst can be present in one part of the system while the other part of the catalyst is added with a reactant. Thus, cobalt can be present in acetic acid and the bromine portion added with substituted aromatic reactant. By removing the product by filtration or centrifugation and reusing the mother liquor of a prior run in a subsequent run, the catalyst can be reused indefinitely.

The aryl sulfide or sulfoxide, which is oxidized in the present invention, can also contain other substituents which are relatively inert and which do not interfere with the oxidation process. Thus, the aryl sulfide or sulfoxide molecule can contain acid groups, ester groups, acoyl groups, ketone groups, ether linkages, chloride, bromide, fluoride, and the like.

Broadly, by subjecting aromatic sulfides and sulfoxides having the general formula described previously, compounds of the following general formula are obtained:

wherein Z is selected from a

group, a

group, hydrogen, and an unchanged R group, at least one Z containing an oxidized group, $n$ is 1 to 5, and Ar and R are as defined earlier.

In one presently preferred embodiment of the invention, a sulfide or sulfoxide having the general formula

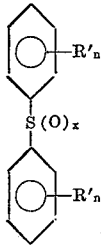

wherein $x$ is 0 or 1, R' is an alkyl substituent containing from 1 to 6 carbon atoms and in which the α-carbon is attached to at least two hydrogens, and $n$ can vary from 1 to 5, is contacted with oxygen and the specific catalyst of the invention in a solvent such as acetic acid to form a compound of the general formula

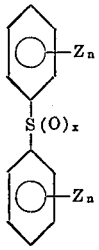

wherein Z is hydrogen or a

group, or a

group in which R" contains one less carbon atom than R', or an unchanged R' group, at least one Z containing an oxidized group, and $n$ is 1 to 5.

The examples illustrate that oxidation of p-tolylsulfide results in the formation of 4,4'-thiodibenzoic acid, the oxidation of p-tolylsulfoxide, in the formation of 4-carboxyphenyl-p-tolyl sulfoxide, a new composition of matter. Other reactions and their respective oxidized products include examples such as:

the conversion of m-tolyl sulfoxide to 3,3'-sulfinyldibenzoic acid;

the conversion of bis(3,4,5-trimethylphenyl) sulfide to 5,5'-thiobis(1,2,3-benzenetricarboxylic acid);

the conversion of bis(p-ethylphenyl) sulfide to p,p'-thiobis(acetophenone);

the conversion of phenyl p-ethylphenyl sulfide to phenylthio-p-acetophenone;

the conversion of bis(3,5-dichloro-4-methylphenyl) sulfide to 4,4'-thiobis(2,6-dichlorobenzoic acid), and the like.

In general, substituted diaryl sulfides will form thiodiaryl acids or thiodiaryl ketones. Similarly, substituted diaryl sulfoxides will give the corresponding sulfinyldiaryl acids or ketones. This result is surprising in view of the known oxidation sensitivity of the sulfide and sulfoxide groups. The substituted diaryl sulfones are also oxidized by this system without disturbing the sulfone group but this is not unexpected since in these compounds the sulful is already fully oxidized.

EXAMPLE I 4,4'-thiodibenzoic acid

A stream of oxygen was bubbled through a solution of 2.49 g. (0.01 mol) of cobalt (II) acetate tetrahydrate, 150 ml. glacial acetic acid, 2.7 g. (0.01 mol) 30% hydrogen bromide in acetic acid and 21.4 g. (0.1 mol) of p-tolylsulfide at reflux temperature. After one hour a solid began to separate. The reaction was continued one additional hour and cooled. The mixture was filtered, the residue washed with 50 ml. of glacial acetic acid and dried to give 21.0 g. of product; M.P. 313–325° C. The filtrate was saved for use in run described below. The above product was dissolved in a solution of 8 g. of sodium hydroxide in 300 ml. of water. The solution was made acid with 40 ml. of concentrated hydrochloric acid, the precipitate filtered, washed with water and dried to give 20.3 g. of product; M.P. 317–320° C.

To the filtrate saved from above (containing catalyst and unrecovered product) was added 21.4 g. (0.1 mol) of p-tolylsulfide, 50 ml. of acetic acid was distilled, then oxygen was bubbled through the solution at reflux temperature for two hours. After cooling, the product was filtered, washed with 100 ml. of glacial acetic acid, 100 ml. of water, 50 ml. of methanol and dried. The yield of product was 32.9 g., M.P. 320–325° C. The overall yield of 4,4'-thiodibenzoic acid from the two runs was 97.3% based on the sulfide charged.

EXAMPLE II 4,4'-thiodibenzoic acid

A stream of oxygen was bubbled through a solution of 7.5 g. (0.03 mol) cobalt (II) acetate tetrahydrate, 250 ml. glacial acetic acid, 8.1 g. (0.03 ml.) 30% hydrogen bromide in acetic acid and 69 g. (0.32 mol) p-tolylsulfide while heating at reflux temperature for 5½ hours and then cooled. The mixture was filtered, washed with acetic acid, dilute hydrochloric acid and water and dried. The yield was 78.5 g. (0.286 mol) (90%); M.P. 314–322° C.

Products from this and the preceding example were combined, heated with boiling acetone, filtered, washed with acetone and dried, to give a product of M.P. 319–321° C.

*Analysis.*—Calc'd for $C_{14}H_{10}O_4S$ (percent): C, 61.30; H, 3.67; O, 23.33; S, 11.69; $CO_2H$, 7.3 meq/g. Found (percent): C, 61.2; H, 3.65; O, 23.8; S, 11.63; $CO_2H$, 7.12 meq/g.

IR spectrum—confirmed the presence of carboxyl groups and sulfide linkage.

EXAMPLE III

4,4'-sulfinyldibenzoic acid

A stream of oxygen was bubbled through a solution of 14.9 g. (0.06 mol) cobalt (II) acetate tetrahydrate, 400 ml. glacial acetic acid, 16.2 g. (0.06 mol) 30 percent hydrogen bromide in acetic acid, 126.7 g. (0.55 mol) p-tolylsulfoxide and 1 g. AIBN at reflux temperature. After 1½ hours a solid separated. The reaction was continued for an additional 5 hours and cooled. The mixture was filtered, the residue washed with acetic acid, dilute hydrochloric acid and dried. The filtrate was reserved for further treatment. The yield was 65 g.; M.P. 290–297° C. The product was stirred in boiling acetone, filtered, washed with acetone and dried to give 58.9 g. (37 percent yield) of desired product M.P. 294–301° C.

*Analysis.*—Calc'd for $C_{14}H_{10}O_5S$ (percent): C, 57.92; H, 3.47; O, 27.56; S, 11.05; $CO_2H$, 6.9 meq/g. Found (percent): C, 57.21; H, 3.85; O, 27.9; S, 11.04; $CO_2H$, 6.66 meq/g.

IR spectrum—confirmed the presence of carboxyl groups at 5.95μ and S→O at 9.50μ.

Other runs showed equally satisfactory results without the presence of AIBN (α,α-azo-bisisobutyronitrile).

The first filtrate obtained above was diluted with water to yield another crop of crystals which was filtered, washed with hydrochloric acid and dried to give 65.2 g. of a product M.P. 173–180° C. This product was stirred with boiling acetone, filtered, and dried to give 32.2 g. of a product M.P. 196–200° C. which analyzes as the half-acid 4-carboxyphenylp-tolyl-sulfoxide.

Calculated: $CO_2H$, 3.5 meq/g. Found: $CO_2H$, 3.92 meq/g.

IR spectrum showed carboxyl group and S→O group absorption.

Reasonable variation and modification are possible within the spirit and scope of the invention, the essence of which is a method for oxidizing the α-carbon atom of at least one alkyl substituent on an aryl sulfide or aryl sulfoxide by contacting with oxygen and a catalyst consisting essentially of a cobalt salt, a carboxylic acid, and a bromine reagent.

I claim:

1. A process for oxidizing the saturated α-carbon atom of at least one of the alkyl substituents of a compound of the formula

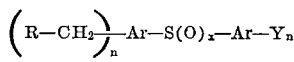

wherein $x$ is selected from 0 and 1, each $n$ is 1 to 5, each Ar is selected from monocyclic and polycyclic aromatic radicals, R is selected from hydrogen, alkyl, aryl, and cycloalkyl radicals, each Y is selected from hydrogen and a (R—$CH_2$)- radical, which comprises contacting in a reaction zone said compound in a liquid phase in said zone containing no more than 0.05 part water per part reaction solvent with oxygen and a catalyst consisting essentially of a cobalt salt, a carboxylic acid, and a bromine reagent to form compounds having the formula $$Ar-Z_n$$
$$|$$
$$S(O)_x$$
$$|$$
$$Ar-Z_n$$

wherein Z is selected from a

group, a

group, hydrogen, and an unchanged R group, at least one Z containing an oxidized group, $n$ is 1 to 5, and Ar and R are as defined above, the amount of oxygen present during said contacting being in the range 0.01 to 10 parts by weight per part of said compound and the ratio of bromine to cobalt present during said contacting being in the range of 0.1 to 2 atoms of bromine per atom of cobalt.

2. A process as defined in claim 1 wherein said Ar contains from 6–14 carbon atoms, said R contains from 1–20 carbon atoms, and the total number of carbon atoms in the molecule ranges from 13–50.

3. A process as defined in claim 2 wherein both Ar's are phenylene radicals.

4. A process as defined in claim 3 wherein said compound is p-tolylsulfide.

5. A process as defined in claim 3 wherein said compound is p-tolylsulfoxide.

6. The process of claim 1 wherein said compound has the formula

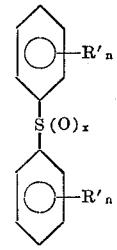

wherein $x$ is 0 or 1, R' is an alkyl substituent containing from 1 to 6 carbon atoms and in which the α-carbon is attached to at least two hydrogens, and $n$ varies from 1 to 5, said product has the formula

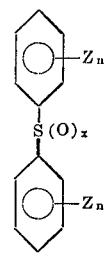

wherein Z is hydrogen or a

group, or a

group in which R" contains one less carbon atom than R', or an unchanged R' group, at least one Z containing an oxidized group, and $n$ is 1 to 5, the temperature during said contacting is in the range 25–160° C., and the ratio of bromine to cobalt present during said contacting is in the range of 0.1 to 1.2 atoms of bromine per atom of cobalt.

7. A process according to claim 6 wherein the temperature maintained during said contacting is at reflux conditions and water is removed from the reaction zone as the reaction proceeds.

8. The process of claim 6 wherein said compound is p-tolylsulfide which is contacted with oxygen, cobalt (II) acetate tetrahydrate, glacial acetic acid, and hydrogen bromide to produce as product 4,4'-thiodibenzoic acid.

9. A process according to claim 6 wherein said compound is p-tolylsulfoxide which is contacted with oxygen, cobalt (II) acetate tetrahydrate, glacial acetic acid, and hydrogen bromide to produce 4-carboxyphenyl-p-tolyl-sulfoxide.

References Cited

UNITED STATES PATENTS

| | | | |
|---|---|---|---|
| 2,833,816 | 5/1958 | Saffer et al. | 260—524 |
| 2,895,842 | 7/1959 | Caldwell et al. | 260—515 |
| 3,310,586 | 3/1967 | Hay | 260—524 |

OTHER REFERENCES

Chem. Abstracts, vol. 62, p. 7892g, March 1965.
Law et al.: J. Am. Chem. Soc., vol. 52, pp. 3623–27 (1930).

JAMES A. PATTEN, Primary Examiner

U.S. Cl. X.R.

260—515, 516, 590, 591, 592